US012767200B2

(12) United States Patent
Berrouard

(10) Patent No.: US 12,767,200 B2
(45) Date of Patent: Oct. 20, 2026

(54) WHEELBARROW AND A METHOD OF FABRICATION THEREOF

(71) Applicant: GARANT GP, Saint-François-de-la-Rivière-du-Sud (CA)

(72) Inventor: Mathieu Berrouard, Levis (CA)

(73) Assignee: GARANT GP, Saint-François-de-la-Rivière-du-Sud (CA)

(*) Notice: Subject to any disclaimer, the term of this patent is extended or adjusted under 35 U.S.C. 154(b) by 308 days.

(21) Appl. No.: 18/596,057

(22) Filed: Mar. 5, 2024

(65) Prior Publication Data

US 2025/0042456 A1 Feb. 6, 2025

Related U.S. Application Data

(60) Provisional application No. 63/517,227, filed on Aug. 2, 2023.

(51) Int. Cl.
*B62B 1/20* (2006.01)
*B62B 5/06* (2006.01)

(52) U.S. Cl.
CPC .............. *B62B 1/206* (2013.01); *B62B 5/067* (2013.01)

(58) Field of Classification Search
CPC .... B62B 1/20; B62B 3/02; B62B 1/12; B62B 2206/006; B62B 5/065; B62B 1/206; B62B 5/067
See application file for complete search history.

(56) References Cited

U.S. PATENT DOCUMENTS

| | | | |
|---|---|---|---|
| 1,196,776 | A | 9/1916 | Hambay |
| 1,375,921 | A | 4/1921 | Luschen |
| 2,233,710 | A | 3/1941 | Osterkamp |
| 2,242,171 | A | 5/1941 | Boyle |
| 3,045,847 | A | 7/1962 | Fisher |

(Continued)

FOREIGN PATENT DOCUMENTS

| | | | |
|---|---|---|---|
| CA | 224623 | | 10/2024 |
| CN | 201052783 Y | * | 4/2008 |

(Continued)

OTHER PUBLICATIONS

WO-2005051744-A2 English Translation (Year: 2005).*

(Continued)

*Primary Examiner* — Michael T. Walsh

(74) *Attorney, Agent, or Firm* — Lavery, de Billy, L.L.P.; Gwendoline Bruneau

(57) ABSTRACT

A wheelbarrow comprising a tray, a wheel, handles, and a leg unit reversely configurable into a deployed position and a compact position, so that in the deployed position, the wheel is rotatably mounted underneath the tray, the leg unit extends from the bottom wall of the tray, and the handles extend at the rear end of the wheelbarrow; and, in the compact position, the wheel is detached from underneath the tray, the leg unit is withdrawn from the bottom wall of the tray, and the handles are retracted from the rear end of the tray; wherein, from the deployed position, the wheel is dismounted from arms underneath the tray that retract underneath the tray and are locked in the compact position on the bottom wall of the tray by manual action on a bracket, and the leg unit as well as the handles are withdrawn by unsnapping handle buttons.

19 Claims, 13 Drawing Sheets

(56) References Cited

U.S. PATENT DOCUMENTS

| | | | | | |
|---|---|---|---|---|---|
| 3,282,600 | A * | 11/1966 | Tonelli | B62B 1/18 280/47.31 |
| 3,722,904 | A | 3/1973 | Puckett | |
| 4,951,956 | A | 8/1990 | Vittone | |
| 5,372,376 | A | 12/1994 | Pharaoh | |
| 5,531,463 | A | 7/1996 | Givens | |
| 6,220,621 | B1 * | 4/2001 | Newton | B62B 5/0023 280/650 |
| 6,908,089 | B1 | 6/2005 | Stark | |
| 7,104,565 | B1 * | 9/2006 | Albert | B62B 1/206 280/47.18 |
| 7,226,072 | B2 * | 6/2007 | Shapiro | B62B 1/208 280/47.33 |
| 8,857,826 | B2 | 10/2014 | Frenkel | |
| 10,336,355 | B1 | 7/2019 | Dubose | |
| 2002/0084119 | A1 | 7/2002 | Brabetz | |
| 2003/0201616 | A1 | 10/2003 | Friel | |
| 2005/0087958 | A1 | 4/2005 | Tomchak | |
| 2005/0127626 | A1 | 6/2005 | Haemmerlin | |
| 2007/0089917 | A1 | 4/2007 | Hartley | |
| 2008/0265537 | A1 | 10/2008 | Lin | |
| 2009/0179393 | A1 | 7/2009 | Ludlow | |
| 2009/0243242 | A1 | 10/2009 | Houston | |
| 2011/0139038 | A1 | 6/2011 | Pipkorn | |
| 2017/0282947 | A1 | 10/2017 | Meyer | |
| 2018/0237045 | A1 | 8/2018 | Van Zandt | |
| 2021/0114641 | A1 * | 4/2021 | Chenge | B62B 1/206 |
| 2024/0132128 | A1 | 4/2024 | Vesely | |
| 2024/0227908 | A1 | 7/2024 | Naylor | |

FOREIGN PATENT DOCUMENTS

| | | | | |
|---|---|---|---|---|
| CN | 305609690 | | 2/2020 | |
| CN | 307739219 | | 12/2022 | |
| GB | 2135249 | A * | 8/1984 | B62B 1/206 |
| GB | 2388822 | A * | 11/2003 | B62B 1/20 |
| GB | 6348633 | | 3/2024 | |
| WO | 2005/051744 | | 6/2005 | |
| WO | WO-2005051744 | A2 * | 6/2005 | B62B 1/208 |

OTHER PUBLICATIONS

GB-2135249-A English Translation (Year: 1984).*

GB-2388822-A English Translation (Year: 2003).*

CN-201052783-Y English Translation (Year: 2008).*

Bosmere W302 Metal Folding Wheelbarrow_https://www.walmart.ca/en/ip/BOSMERE-W302-Brouette-pliante-en-m-tal/PRD74RV19A6P8W8_2020-08-06.

Cyclone Lock+Load Wheelbarrow by Katapult Desing_https://www.youtube.com/watch?v=gUPK7ZHwl2l_2020-08-11.

COOLTHINGS_Fold-It Utility Cart, A Wheelbarrow that Folds Flat For Easy Storage_https://www.coolthings.com/fold-it-utility-cart/_2020-08-06.

Pancake Wheel-Best Folging Wagnons, Carts, Strollers_http://www.pancakewheel.com/products.html_2020-08-06.

Corona 5 Cubic Foot Wheelbarrow (online), (dated: Apr. 11, 2024) Retrieved from Internet (Dec. 14, 2024), URL: https://www.amazon.com/dp/B0CRBL2DNW (Year: 2024).

Garant Gardening Wheelbarrow Model S4S (online), Retrieved from Internet (Dec. 14, 2024), URL: https://www.garant.com/en/collections/wheelbarrows-and-carts/products/brouette-de-jardinage (Year: 2024).

UnionTools SP5U16 Wheelbarrow (online), (dated: Dec. 11, 2024) Retrieved from Internet (Dec. 14, 2024), URL: https://www.dkhardware.com/union-tools-sp5u16-wheelbarrow-poly-5-cu-ft-product-6544947.html (Year: 2024).

VEVOR Wheelbarrow Cart (online), (dated: Nov. 1, 2024) Retrieved from Internet (Dec. 14, 2024), URL: https://www.amazon.com/dp/B0DHKRVPSL (Year: 2024).

* cited by examiner

WHEELBARROW AND A METHOD OF FABRICATION THEREOF

CROSS REFERENCE TO RELATED APPLICATIONS

This application claims benefit of U.S. provisional application Ser. No. 63/517,227, filed on Aug. 2, 2023. All documents above are incorporated herein in their entirety by reference.

FIELD OF THE INVENTION

The present invention relates to wheelbarrows. More specifically, the present invention is concerned with a wheelbarrow and a method of fabrication thereof.

BACKGROUND OF THE INVENTION

Wheelbarrows are wheeled hand-propelled load-carrying vehicles, typically comprising a wheeled tray for receiving a load to be carried. A wheelbarrow needs to be configured to distribute the weight of the load so that a user may operate it using handles in cases the load is heavy and bulky, such as for example in the construction industry and in gardening.

Two-wheel wheelbarrows may provide increased stability on level grounds. One-wheel wheelbarrows may provide increases maneuverability in small spaces, on planks, in water, or on tilted grounds where the load is at risk of being thrown off balance; and may further provide greater control of the deposition of the load upon emptying.

The tray may be flexible, in case of light duty applications such as carrying leaves, grass clippings, or other lightweight loads for example; a rigid tray may be preferred for medium to high duty applications such as heavy gardening or construction for example.

Depending on the size of the tray, and since handles and wheel or wheels, as well as sometimes a noose guard, protrude from the tray, wheelbarrows may be bulky and take up room even when empty and not being actually used, for example when stored in a storage place such as a garage or a shed or in a storage room, or during transportation between remote sites, such as to the user's residence from a shop, or between job sites or for shipping purposes.

There is still a need in the art for a wheelbarrow and a method of fabrication thereof.

SUMMARY OF THE INVENTION

More specifically, in accordance with the present invention, there is provided a wheelbarrow comprising a tray, a wheel, handles, and a leg unit, and configurable into one of: i) a deployed position and ii) a compact position; wherein, i) in the deployed position, the wheel is rotatably mounted underneath the tray; the leg unit is connected to a bottom wall of the tray; and the handles extend at a rear end of the tray; and ii) in the compact position, the wheel is dismounted from underneath the tray; the leg unit is disconnected from the bottom wall of the tray; and the handles are one of: i) retracted from the rear end of the tray underneath the tray and ii) removed from the rear end of the tray.

There is further provided a wheelbarrow comprising a tray, a wheel, handles, and a leg unit, and configurable into one of: i) a deployed position, and ii) a compact position, wherein the leg unit comprises a first member, and a second member; wherein, i) in the deployed position: the wheel is rotatably mounted underneath the tray; the first member is snapped at respective ends thereof on the bottom wall of the tray, the second member is snapped at a first end thereof on the bottom wall of the tray and connected at a second end thereof to the first member; and the handles extend at the rear end of the tray from respective sleeves on outer surfaces of the tray; and ii) in the compact position, the wheel is dismounted from underneath the tray; the leg unit is disconnected from the bottom wall of the tray; and the handles are one of: i) retracted from the rear end of the tray and ii) removed from the rear end of the tray; wherein, from the deployed position, the wheel is dismounted from arms underneath the tray, the arms are retracted on the bottom wall of the tray by acting on a bracket to disengage snap buttons, and once retracted underneath the tray on the bottom wall of the tray, engaging back the snap buttons by acting on the bracket to lock the arms in the compact position; the first member and the second member are unsnapped from the bottom wall of the tray; the handles are one of: i) retracted within said respective sleeves by unsnapping handle buttons and sliding back within said sleeves from the rear end of the tray and ii) removed from said sleeves by unsnapping handle buttons.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

Figure 1:
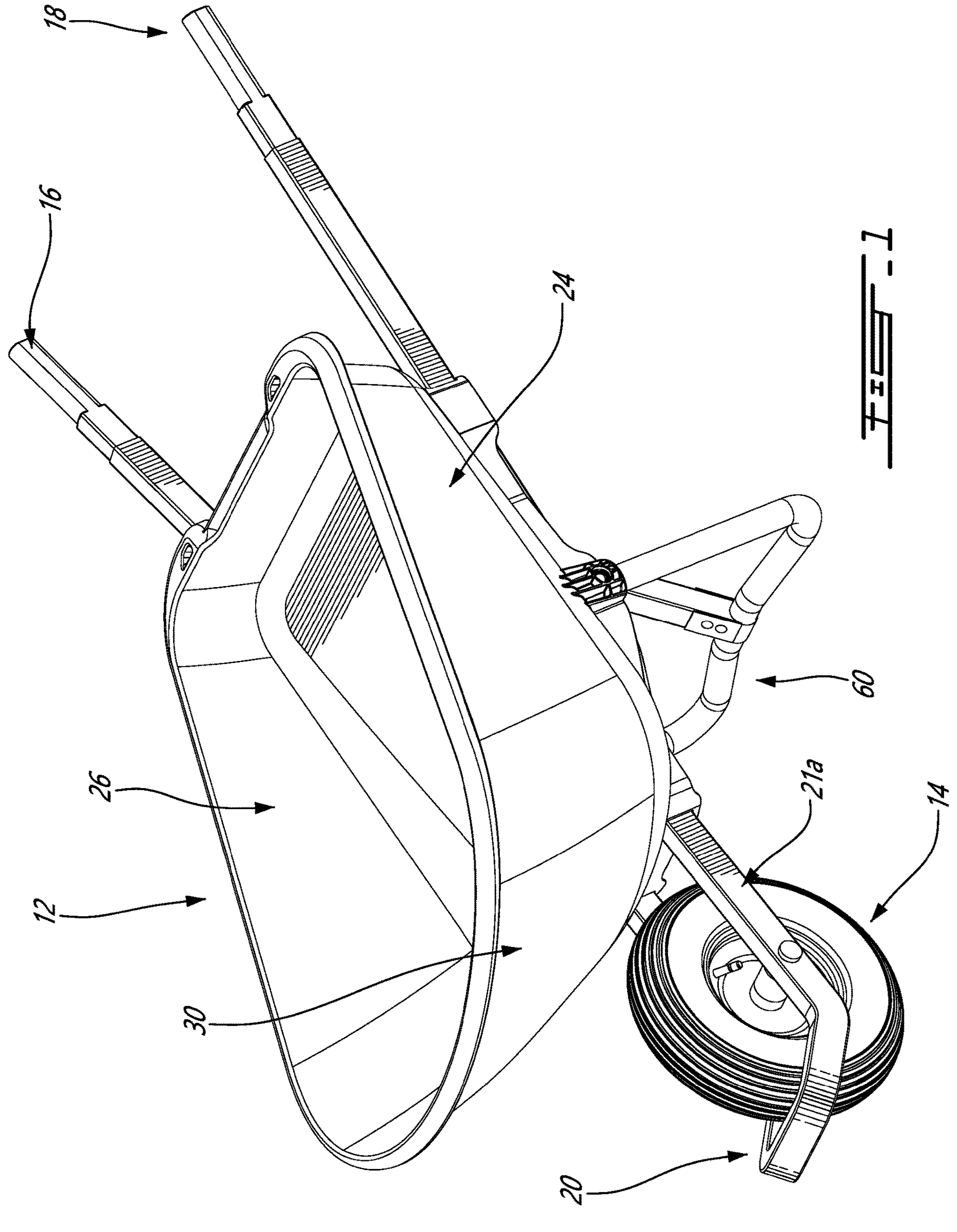
FIG. 1 is a perspective view of a wheelbarrow in a deployed position thereof according to an embodiment of an aspect of the present disclosure.
Figure 2:
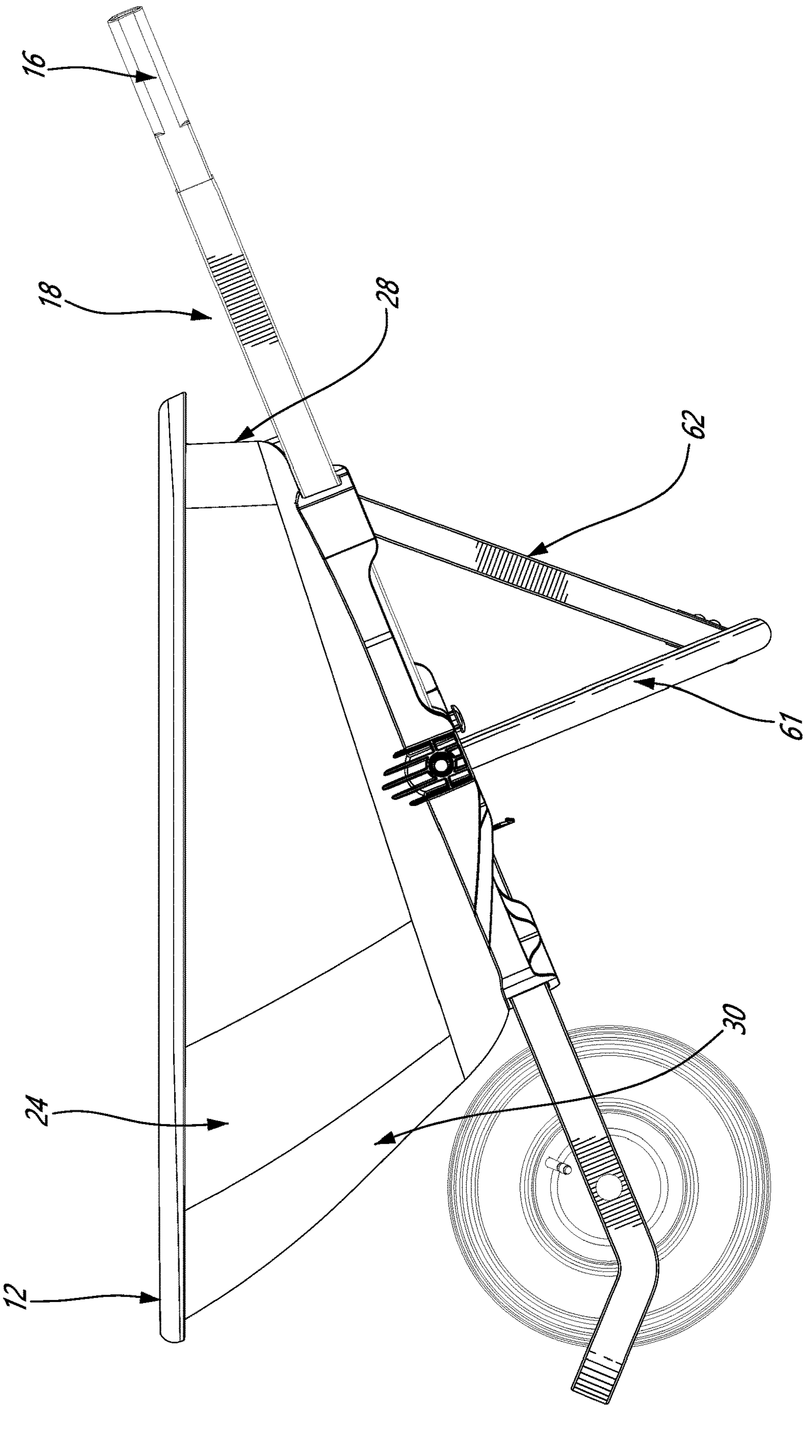
FIG. 2 is a side view of a wheelbarrow in a deployed position thereof according to an embodiment of an aspect of the present disclosure.

A wheelbarrow according to an embodiment of an aspect of the present disclosure as illustrated in a deployed position thereof in FIG. 1 comprises a tray 12, a wheel 14, handles 16, 18, and a leg unit 60.

The tray 12 generally comprises a bottom wall 22, side walls 24, 26, a back wall 28 and a front wall 30. The lower surface 32 of the bottom wall 22 may comprise reinforcing ribs, depending on a material of the tray and a target rigidity; as shown for example in FIG. 6, reinforcing ribs 50 may be symmetrically positioned relative to a longitudinal axis of the bottom wall 22 of the tray 12, and extend from the rear edge to the front edge of the lower surface 32 of the tray 12, to form a reinforcing rib mesh converging from the front edge to the rear edge of the lower surface 32 of the bottom wall 22 (see stipple lines in FIG. 6). Alternatively, the reinforcing ribs may run generally parallel to the edges of the side walls 24, 26 of the tray.

In a deployed position of the wheelbarrow (FIGS. 1-7, 12 and 13), the wheel 14 is rotatably mounted on a hub supported by arms 21*a*, 21*b* underneath the tray 12. The arms 21*a*, 21*b* may further support a nose guard 20 of the tray (see FIG. 4 for example). The leg unit 60 is connected to the bottom wall 22 of the tray, underneath the tray. The handles 16, 18 extend at the rear end of the wheelbarrow, at an angle relative to a longitudinal axis of the tray for example as shown in FIGS. 1, 3, 6, 7, 12 and 13, or in alignment with the side walls of the tray; from the bottom wall of the tray as illustrated herein, or from the outer surfaces of the side walls 24, 26 of the tray 12 (not shown). The leg unit extends from underneath the tray and provide ground support when the wheelbarrow is at a standstill. The nose guard 20 provides a tilting point on the ground when discharging a load from the tray as will be discussed hereinbelow; the nose guard 20 is illustrated herein as a U-shaped member extending upward at the front of the wheelbarrow to avoid abutment with the ground when the wheelbarrow is being wheeled.

Figure 3:
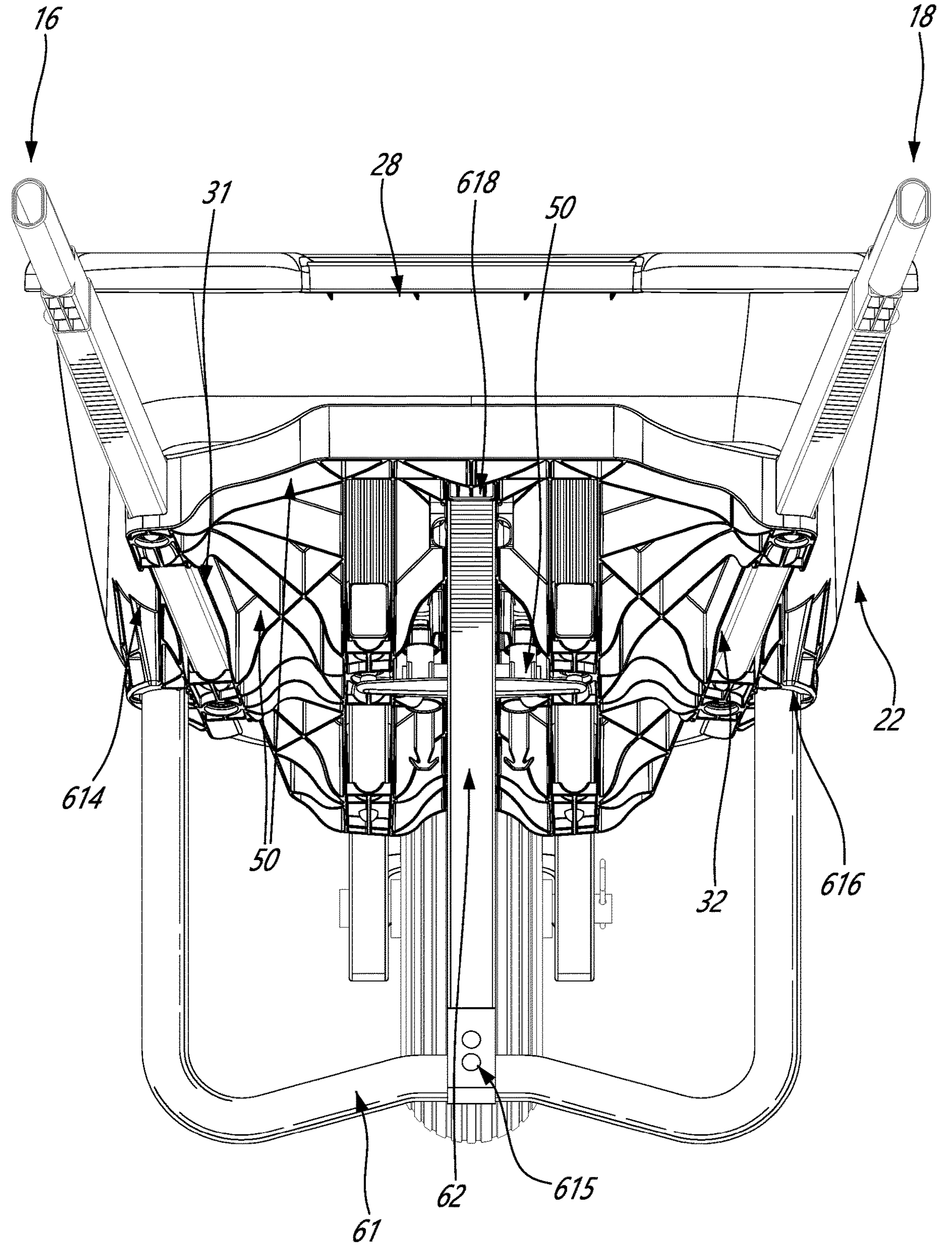
FIG. 3 is a user-end view of a wheelbarrow in a deployed position thereof according to an embodiment of an aspect of the present disclosure.
Figure 4:
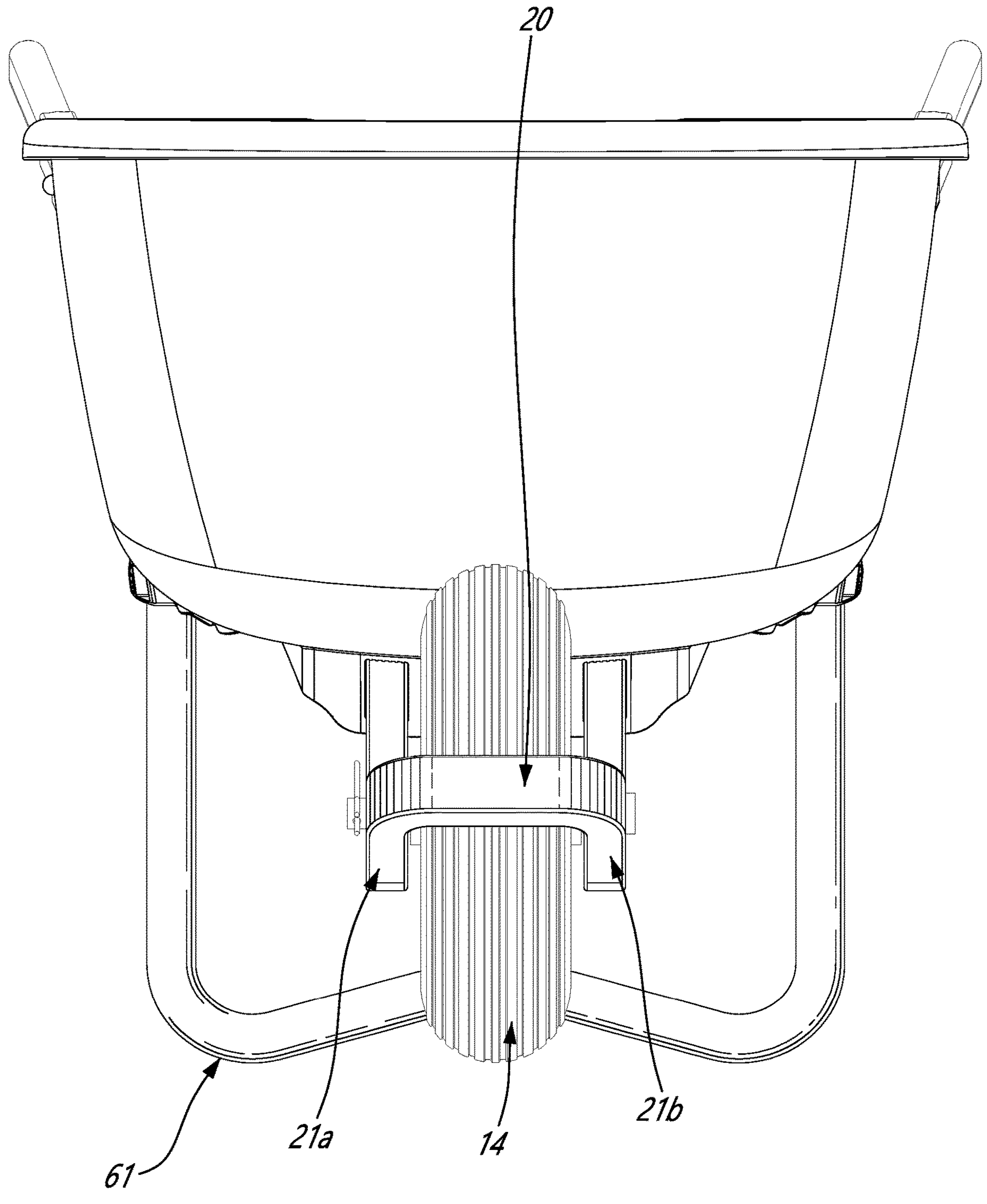
FIG. 4 is a nose guard end view of a wheelbarrow in a deployed position thereof according to an embodiment of an aspect of the present disclosure.
Figure 5:
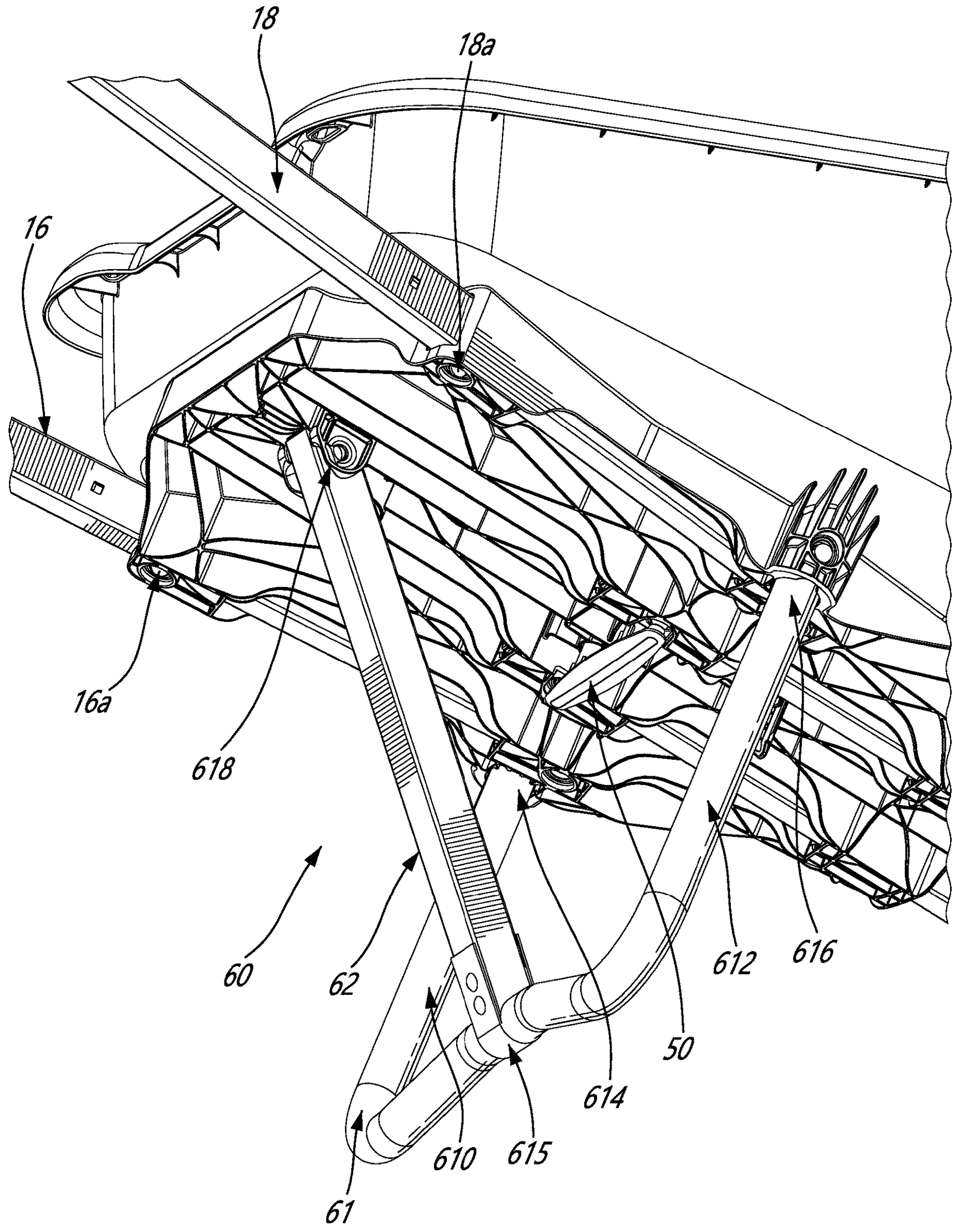
FIG. 5 show details of the bottom of a wheelbarrow in a deployed position thereof according to an embodiment of an aspect of the present disclosure.
Figure 6:
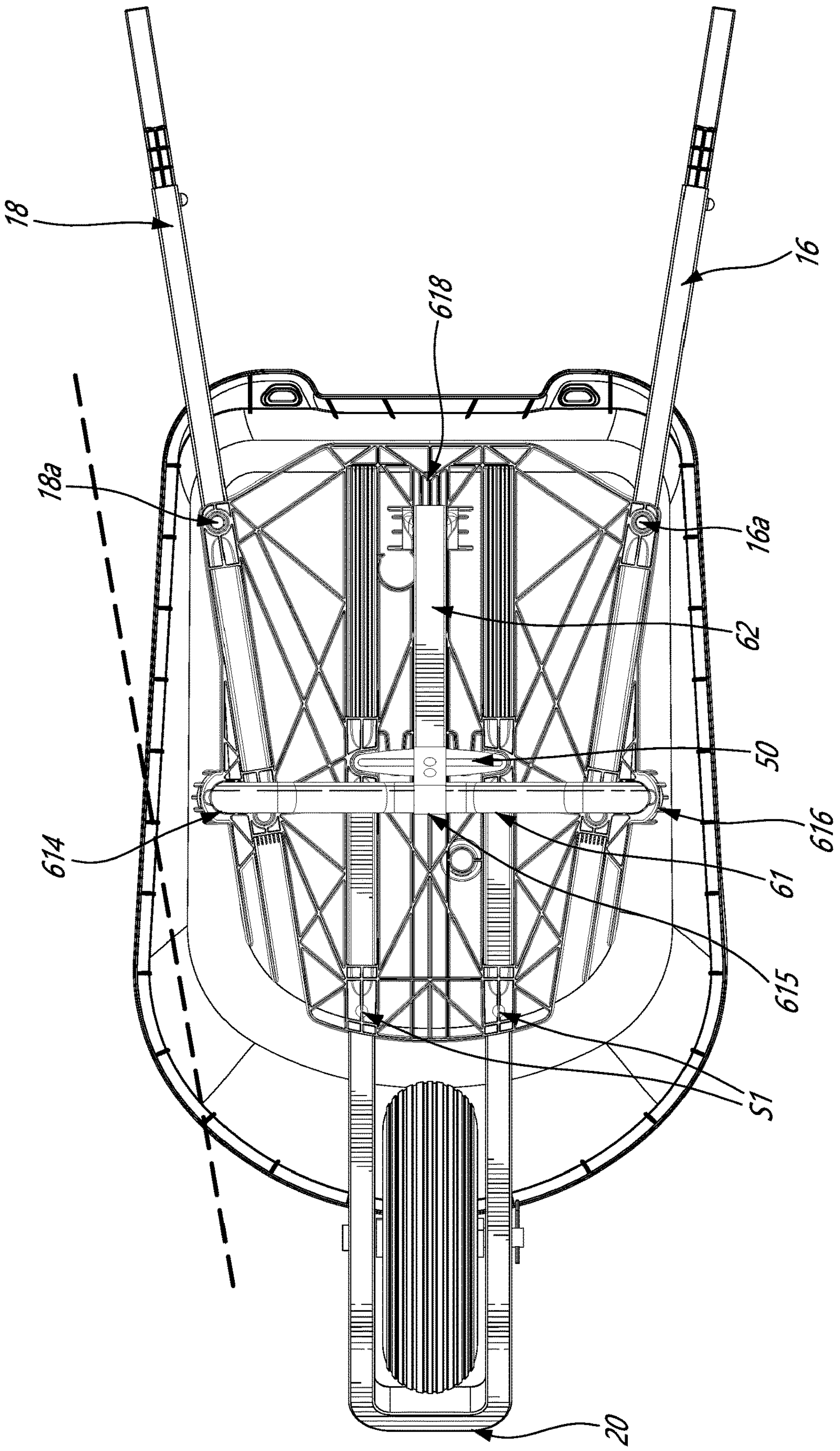
FIG. 6 is a bottom view of a wheelbarrow in a deployed position thereof according to an embodiment of an aspect of the present disclosure.
Figure 7:
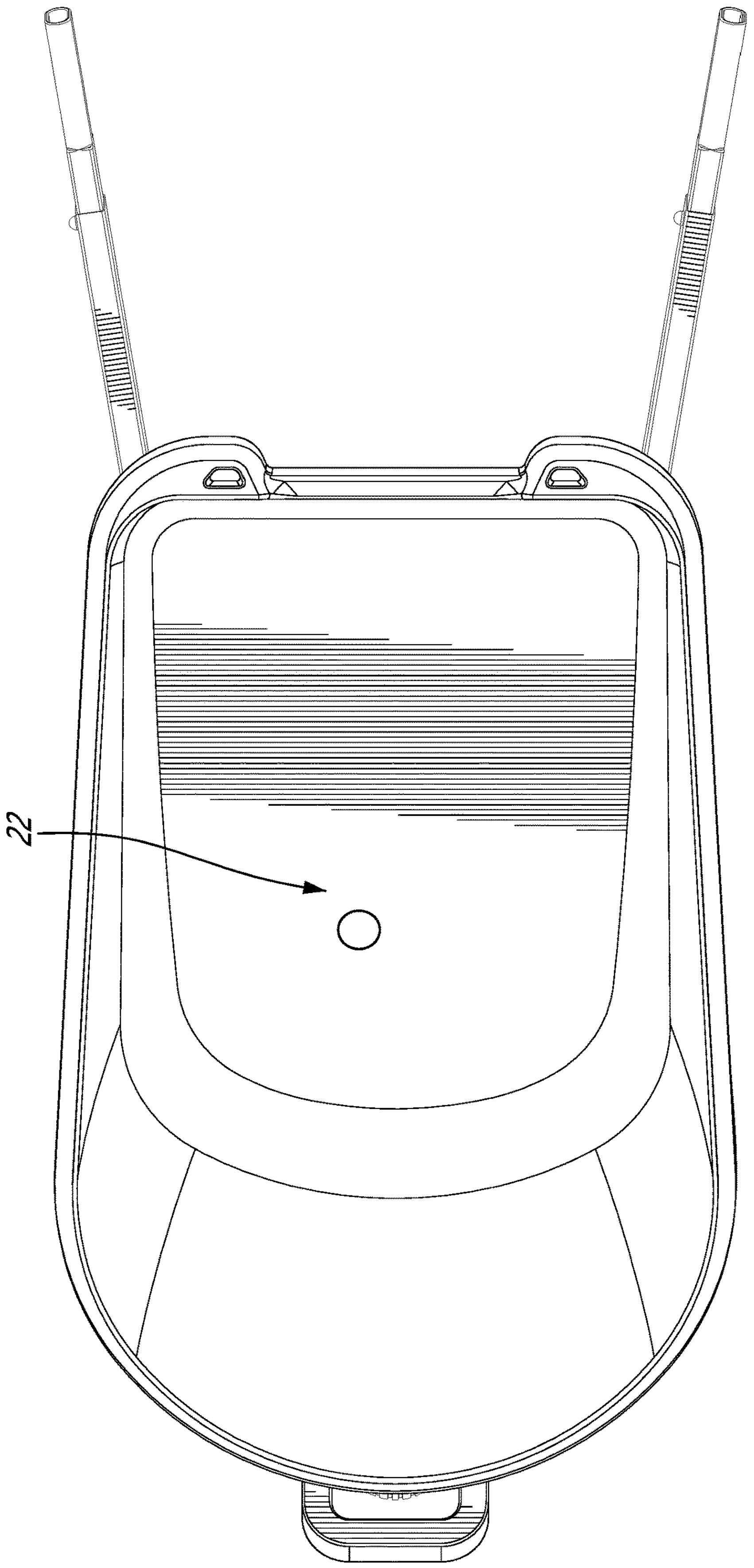
FIG. 7 is a top view of a wheelbarrow in a deployed position thereof according to an embodiment of an aspect of the present disclosure.

In an embodiment illustrated as illustrated for example in FIGS. 3 and 6, the leg unit 60 comprises a first, generally U shaped, member 61, and a second member 62, referred to herein as the bar member 62. In the deployed position, the U shaped member 61 of the leg unit 60 is snapped on the bottom wall 22 of the tray 12 at respective ends 614 and 616 of its generally parallel arms 610 and 612, and the bar member 62 is snapped at a first end 618 thereof on the bottom wall 22 of the tray 12 and connected at a second end thereof 615 to the base of the U shaped member 61. The leg unit, thus connected at three points to the bottom wall of the tray, provides a steady support for the wheelbarrow when at standstill on a ground surface.

From the deployed position, the handles 16, 18 may be retracted within respective sleeves 32, 35 on the bottom wall 22 of the tray 12 using for examples handle buttons 16*a*, 18*a* (FIGS. 5 and 6), or alternatively along the outer surfaces of the side walls 24, 26 of the tray 12 (not shown); alternatively, they may be unsnapped and removed, and secured within the tray for example. The wheel 14 may be dismounted from the arms 21*a*, 21*b*. The arms 21*a*, 21*b* may be retracted within respective sleeves 33, 34 on the bottom wall 22 of the tray 12 by acting on a bracket 50 using a single hand to disengage snap buttons S1 as seen for example in FIG. 6), thereby withdrawing the nose guard 20 generally parallel to the front wall 30 of the tray 12 into a compact position (see FIGS. 8-11); the snap buttons may be engaged back by acting on the bracket 50 using a single hand to lock the arms 22*a*, 22*b* once in the compact position underneath the tray. The leg unit 60 may be unsnapped and dismounted from the bottom wall of the tray (FIGS. 8-11), and may be disposed of, and secured, together with the wheel for example, within the tray 12 (see FIG. 9), using bolt and nut for example through an opening in the bottom wall 22 (best seen in FIG. 7) that may be covered by a cap in the deployed position when using the wheelbarrow.

When using the wheelbarrow in the deployed position, the user may tilt the wheelbarrow by lifting the handles from the rear of the tray, thereby moving a load within the tray forward to the front of the tray, until the nose guard engages a surface, then, by further lifting the handles from the rear of the tray rock the wheelbarrow on the nose guard for discharging the load out of the tray to a target location. For moving the wheelbarrow from one place to another, the user pushes the wheelbarrow holding the handles generally parallel to the ground surface, with the nose guard and the leg unit above the ground surface.

Figure 8:
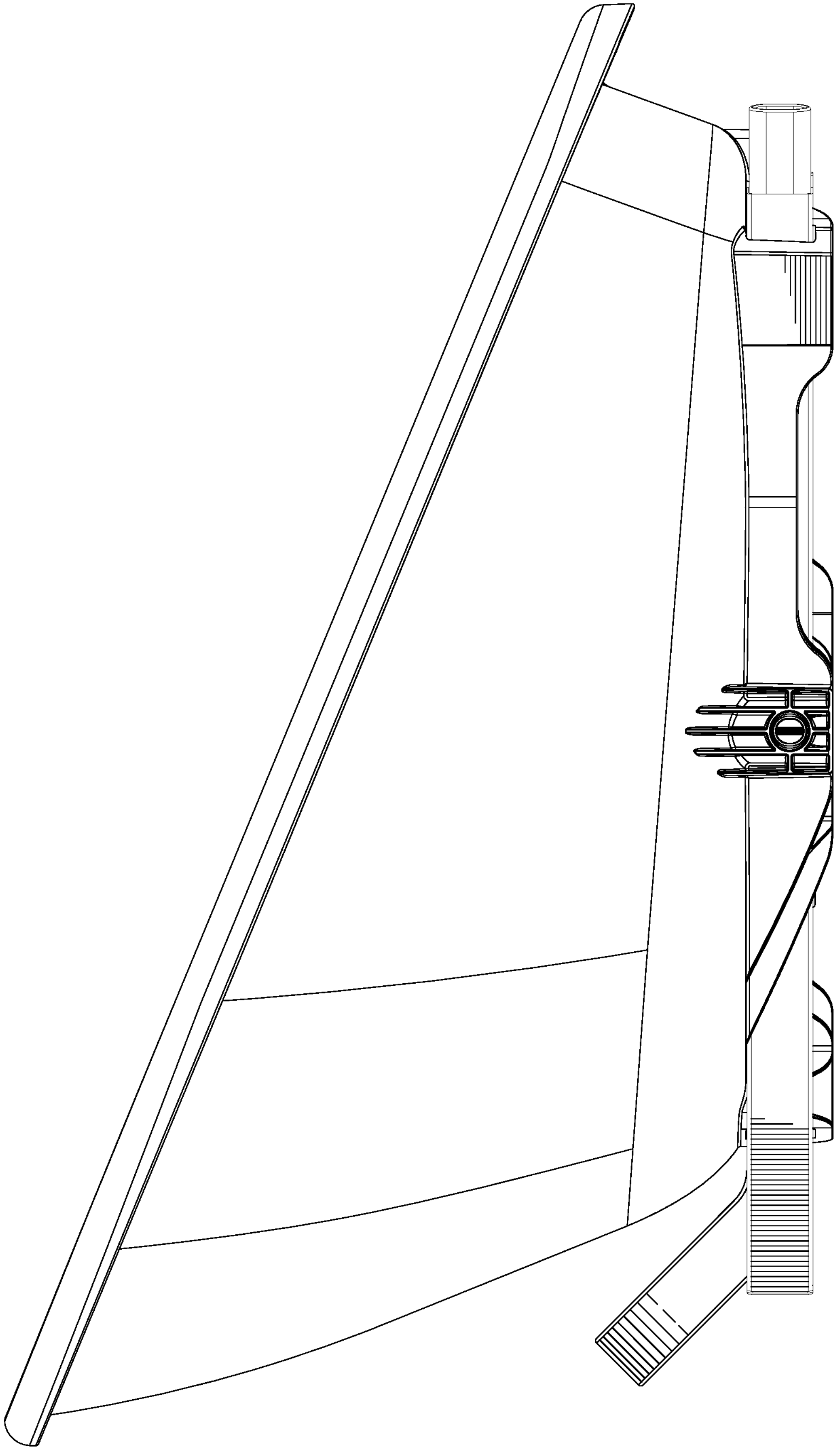
FIG. 8 is a side view of a wheelbarrow in a compact position thereof according to an embodiment of an aspect of the present disclosure.
Figure 9:
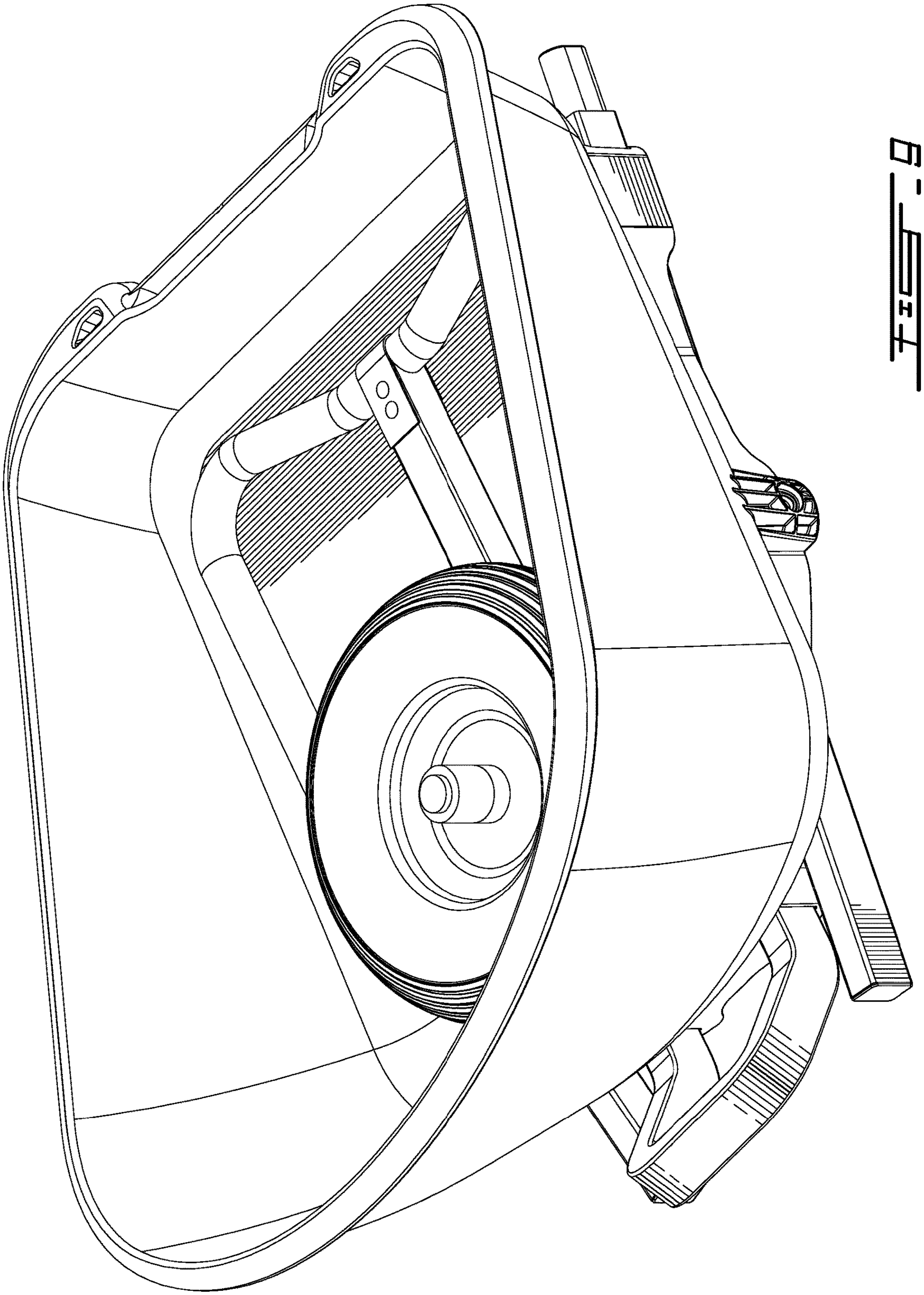
FIG. 9 is a perspective top view of a wheelbarrow in a compact position thereof according to an embodiment of an aspect of the present disclosure.
Figure 10:
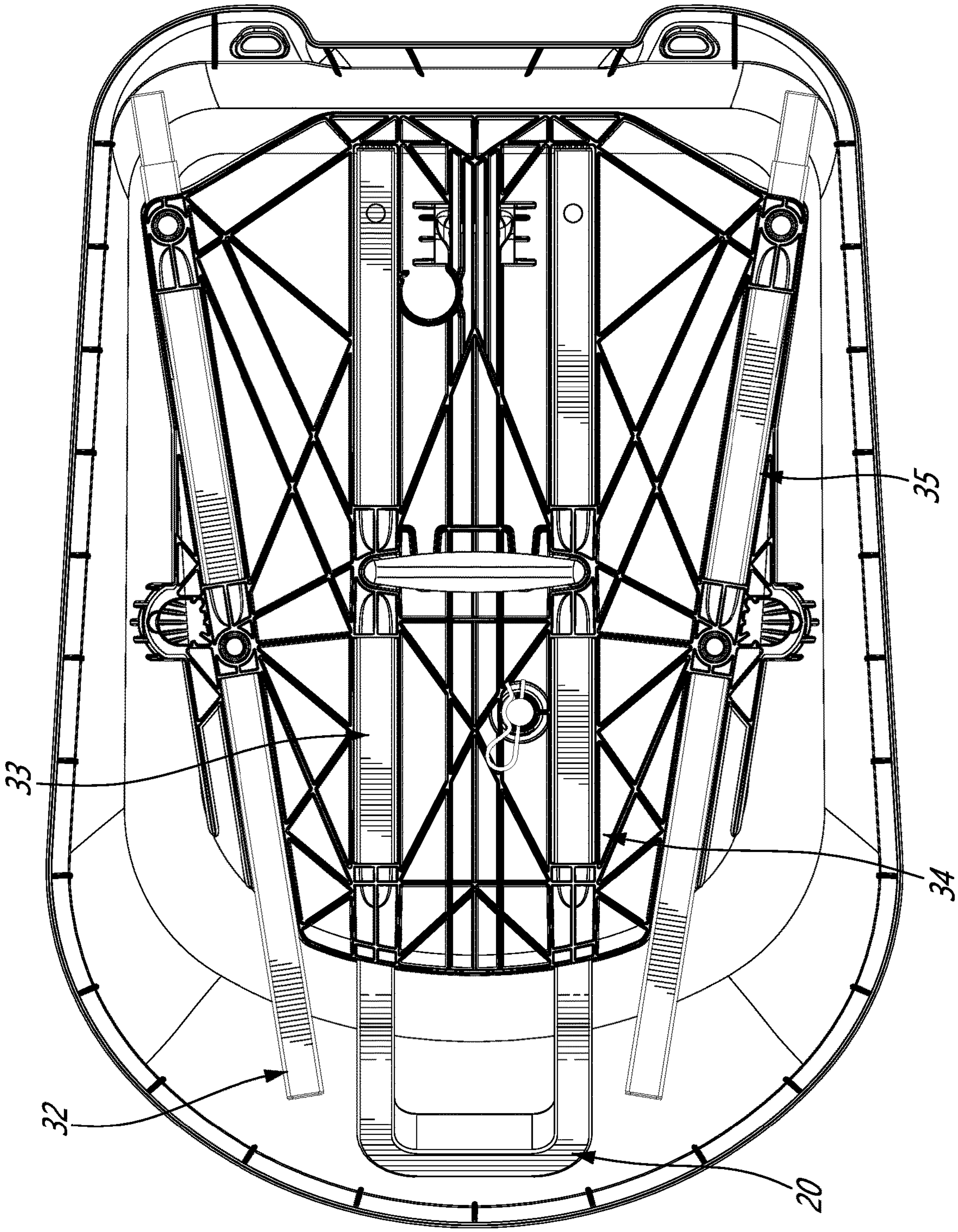
FIG. 10 is a bottom view of a wheelbarrow in a compact position thereof according to an embodiment of an aspect of the present disclosure.
Figure 11:
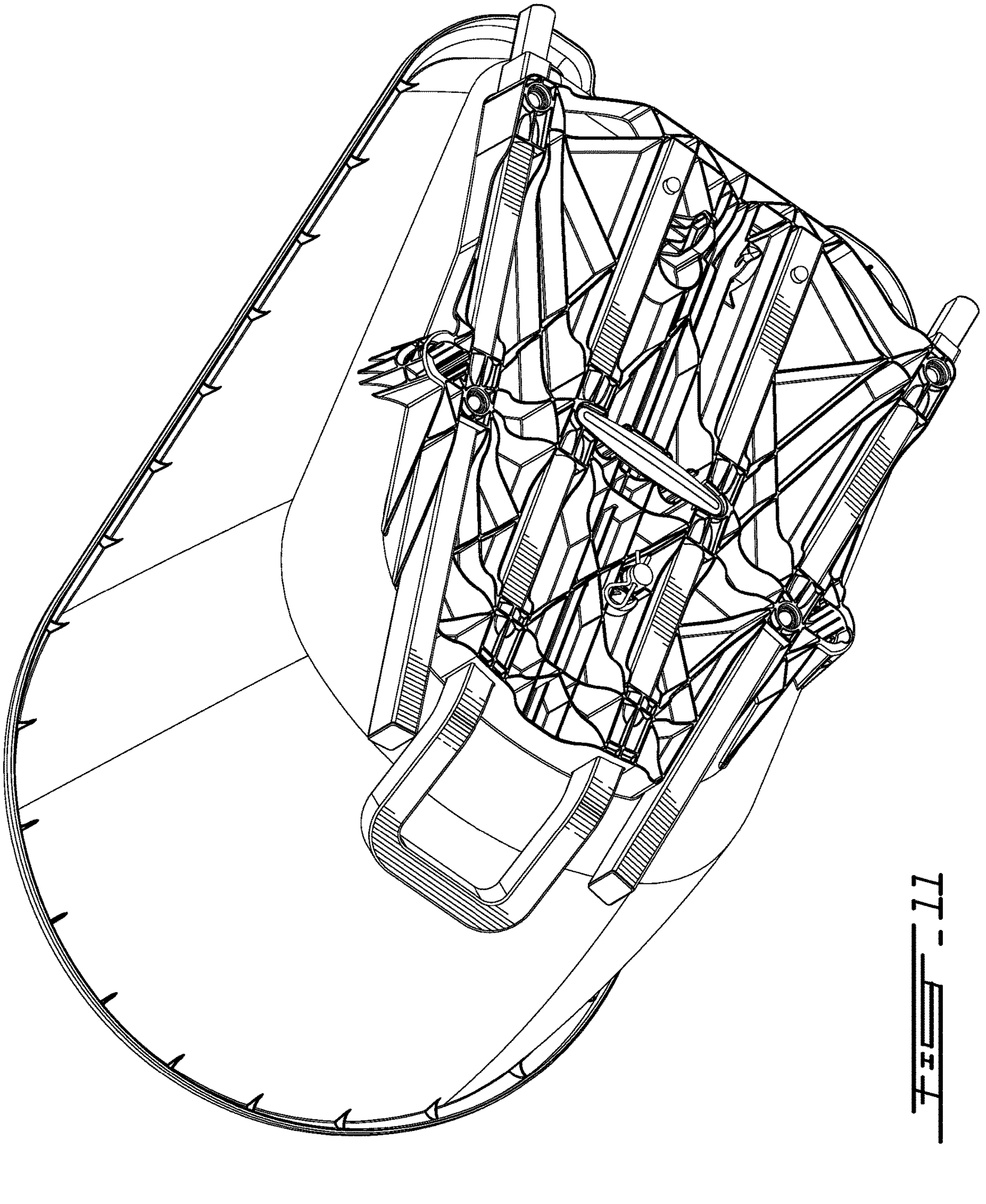
FIG. 11 is a perspective bottom view of a wheelbarrow in a compact position thereof according to an embodiment of an aspect of the present disclosure.
Figure 12:
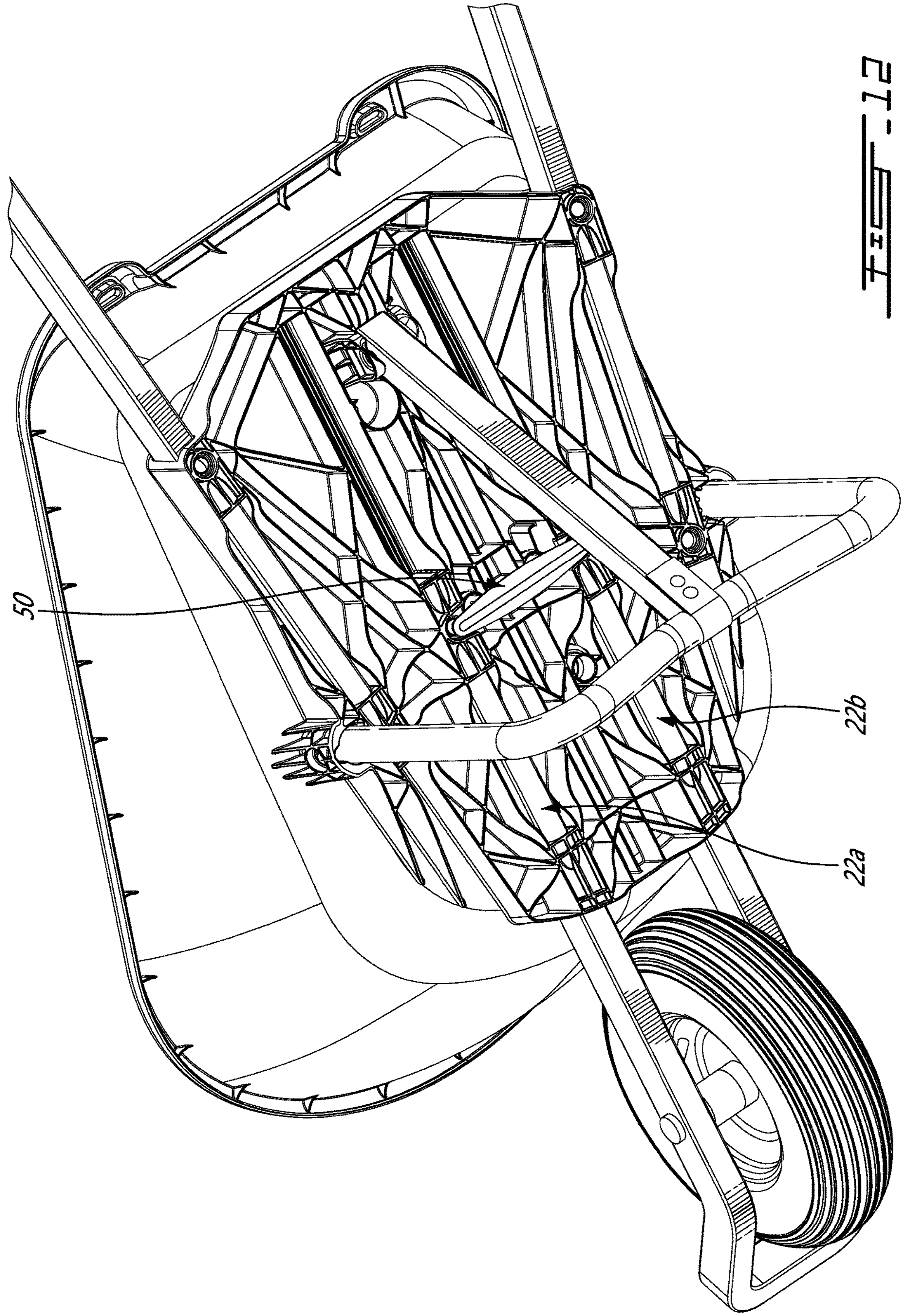
FIG. 12 is a perspective bottom view of a wheelbarrow in a deployed position thereof according to an embodiment of an aspect of the present disclosure.
Figure 13:
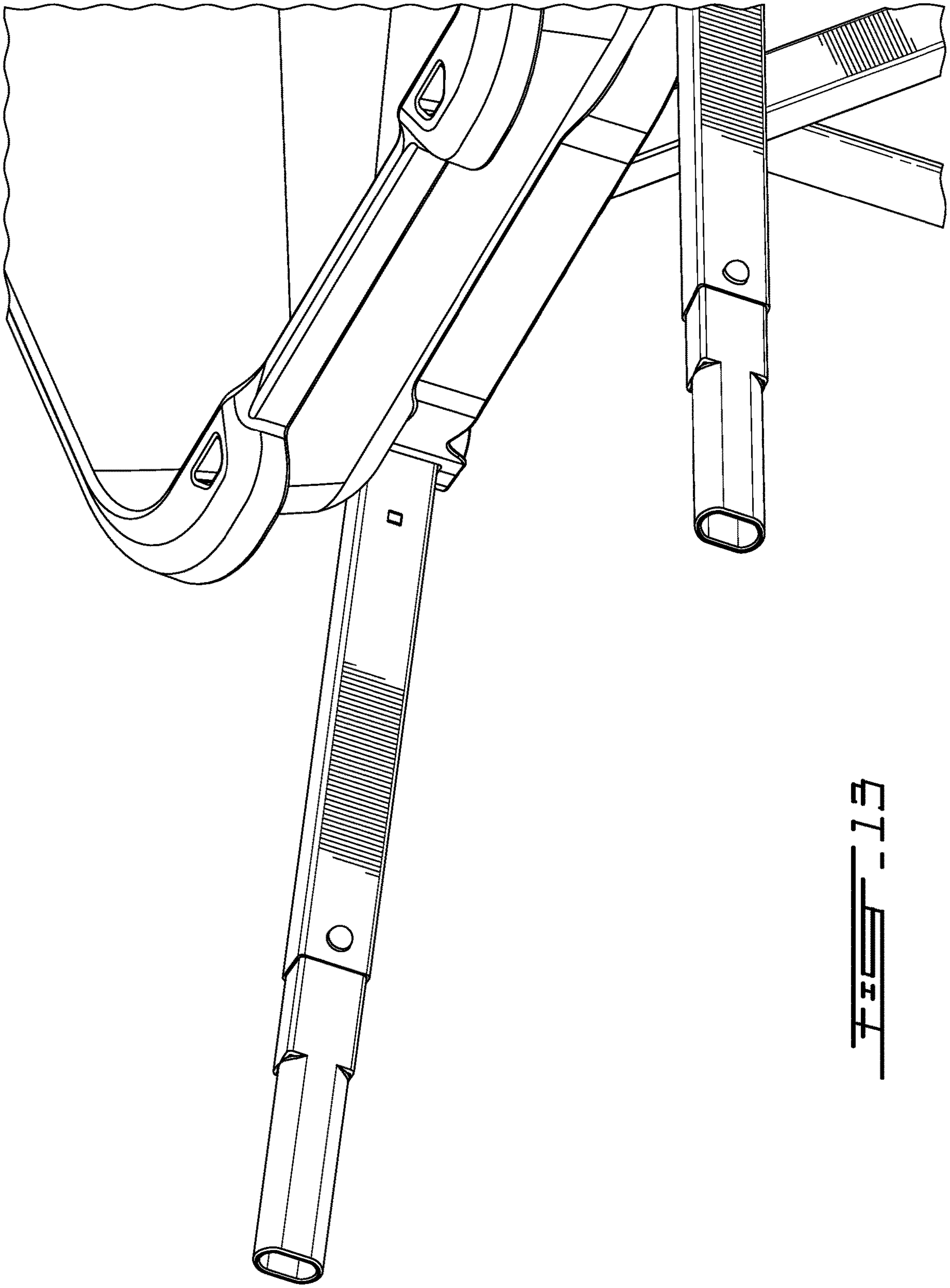
FIG. 13 shows details of handles of a wheelbarrow in a deployed position thereof according to an embodiment of an aspect of the present disclosure.

In the compact position, the handles and arms being retracted and the nose guard safely running generally close and parallel to the front wall of the tray as shown for example in FIGS. 8, 10 and 11, the wheel and the leg unit may be secured within the tray, as shown for example in FIG. 9.

The tray may be a one-piece rigid plastic molded body; the handles 16, 18, the nose guard 20 and the leg unit 60 may be tubular members such as steel tubular members. The arms 21*a*, 21*b*, the leg unit 60 and the handles 16, 18 for example may comprise telescopic members extendable using push buttons for example (see for examples handle buttons 16*a*, 18*a*, FIGS. 5 and 6).

The wheel may be a standard pneumatic wheel and the hub a steel hub.

The present wheelbarrow thus provides functionality in a deployed position, typically for using the wheel, for example for picking up a load from a first site, moving the load to a second site and unloading the load at the second site, and a compact position, typically when the wheelbarrow is not in used, either for storage or during transportation. The compact position provides retractability and integration of protruding members of the wheelbarrow relative to the tray, for maximized compacity.

There is thus generally presented a wheelbarrow comprising a tray, with handles and nose guard that are configured to slide and lock into place back and forth at will and manually, as well as a wheel detachable using a screw and a nut for example and removed from under the tray, between a compact position and a deployed position. The wheelbarrow may be efficiently configured back and forth between the use position and the storage or transportation position by the user, merely using push and/or snaps buttons and/or screw and nut for example, by hand, without the need of tools.

The scope of the claims should not be limited by the embodiments set forth in the examples, but should be given the broadest interpretation consistent with the description as a whole.

The invention claimed is:

1. A wheelbarrow comprising a tray, a wheel, handles, and a leg unit, and configurable into both: a deployed position and a compact position;

wherein:

in the deployed position: the wheel is rotatably mounted on a hub connected to a bottom of the tray by arms; the leg unit is connected to the bottom of the tray; and the handles extend at a rear end of the tray; and in the compact position: the wheel is dismounted from the arms, the arms are slid within respective sleeves on the bottom of the tray; the leg unit is disconnected from the bottom of the tray; and the handles are one of: slid from the rear end of the tray under the bottom of the tray and removed from the rear end of the tray.

2. The wheelbarrow of claim 1, wherein, from the deployed position, the wheel is dismounted from the arms, the arms are slid under the bottom of the tray by acting on a bracket to disengage snap buttons, and once the arms are slid under the bottom of the tray, the arms are locked in the compact position by engaging back the snap buttons by acting on the bracket.

3. The wheelbarrow of claim 1, further comprising a nose guard, said nose guard being configured to be supported by the arms and extended at a front end of the tray in the deployed position, and to be withdrawn from extension at the front end of the tray in the compact position.

4. The wheelbarrow of claim 1, further comprising a nose guard, said nose guard being configured to be supported by the arms and extended at a front end of the tray in the deployed position, and withdrawn from extension at the front end of the tray in the compact position; wherein, from the deployed position, the arms are slid under the bottom of the tray by acting on a bracket to disengage snap buttons, and once the arms are slid under the bottom of the tray, the arms are locked in the compact position by engaging back the snap buttons by acting on the bracket engaging back the snap buttons by acting on the bracket; thereby abutting the nose guard generally parallel to a front wall of the tray into the compact position.

5. The wheelbarrow of claim 1, wherein, from the deployed position, the leg unit is unsnapped and dismounted from the bottom of the tray.

6. The wheelbarrow of claim 1, wherein, from the deployed position, the leg unit is unsnapped and dismounted from the bottom of the tray and further secured within the tray.

7. The wheelbarrow of claim 1, wherein the leg unit comprises a first member, and a second member, and, in the deployed position, the first member is snaped at respective ends thereof on the bottom of the tray, the second member is snapped at a first end 618 thereof on the bottom of the tray and connected at a second end thereof to the first member.

8. The wheelbarrow of claim 1, wherein the handles extend at the rear end of the tray from respective sleeves on outer surfaces of the tray in the deployed position and are retracted within said respective sleeves in the compact position.

9. The wheelbarrow of claim 1, wherein in the deployed position, the handles extend at the rear end of the tray from respective sleeves on outer surfaces of the tray; and, from the deployed position, the handles are retracted within said respective sleeves by unsnapping handle buttons and sliding them within said sleeves from the rear end of the tray.

10. The wheelbarrow of claim 1, wherein in the deployed position, the handles extend at the rear end of the tray from respective sleeves on outer surfaces of the tray; and, from the deployed position, the handles are removed by unsnapping handle buttons and sliding them out of said sleeves from the rear end of the tray.

11. The wheelbarrow of claim 1, wherein the handles extend at an angle relative to a longitudinal axis of the tray at the rear end of the tray in the deployed position.

12. The wheelbarrow of claim 1, wherein the handles extend in alignment with side walls of the tray at the rear end of the tray in the deployed position.

13. The wheelbarrow of claim 1, wherein the leg unit comprises a generally U-shaped member and a bar member, and, in the deployed position, the generally U-shaped member is snapped to the bottom of the tray at respective ends of generally parallel arms of the U-shaped member, and the bar member is snapped at a first end thereof on the bottom of the tray and connected at a second end thereof to a base of the generally U-shaped member, the leg unit being thus connected at three points to the bottom of the tray in the deployed position.

14. The wheelbarrow of claim 1, wherein the leg unit comprises a generally U-shaped member and a bar member, and, in the deployed position, the generally U-shaped member is snapped to the bottom of the tray at respective ends of generally parallel arms thereof, and the bar member is snapped at a first end thereof to the bottom of the tray and connected at a second end thereof to a base of the generally U-shaped member, thus connecting the leg unit at three points to the bottom of the tray in the deployed position in such a way that, in the deployed position, when the wheelbarrow is at a standstill on a surface, the leg unit extends from the bottom of the tray and supports the wheelbarrow on the surface.

15. The wheelbarrow of claim 1, wherein the bottom of the tray comprises reinforcing ribs.

16. The wheelbarrow of claim 1, wherein at least one of the handles and the leg unit is a tubular member.

17. The wheelbarrow of claim 1, wherein at least one of the handles and the leg unit is a tubular member comprising telescopic members extendable using buttons.

18. The wheelbarrow of claim 1, wherein the tray is a one-piece rigid plastic molded body.

19. A wheelbarrow comprising a tray, a wheel, handles, a leg unit, and a nose guard, and configurable into both: a deployed position and a compact position;

wherein:

in the deployed position: the wheel is rotatably mounted on a hub connected to a bottom of the tray by arms and the leg unit is connected to the bottom of the tray in a position and support the wheelbarrow on a ground surface, the handles extending at a rear end of the tray, the nose guard supported by the arms and extended at a front end of the tray away from a front wall of the tray; and in the compact position: the wheel is dismounted from the arms, the arms are retracted within respective sleeves on the bottom of the tray and the nose guard is withdrawn from extension at the front end of the tray and positioned in abutment with the front wall of the tray; the leg unit is disconnected from the bottom of the tray; and the handles are withdrawn from extension at the rear end of the tray;

from the deployed position, the arms are retracted within the respective sleeves on the bottom of the tray by acting on a bracket to disengage snap buttons, and once the arms are retracted under the bottom of the tray, the arms are locked in the compact position by engaging back the snap buttons by acting on the bracket; the leg unit is unsnapped and dismounted from the bottom of the tray.

* * * * *